June 24, 1958  J. A. BRADFORD  2,840,090
CONVEYOR
Filed April 22, 1954  2 Sheets-Sheet 1
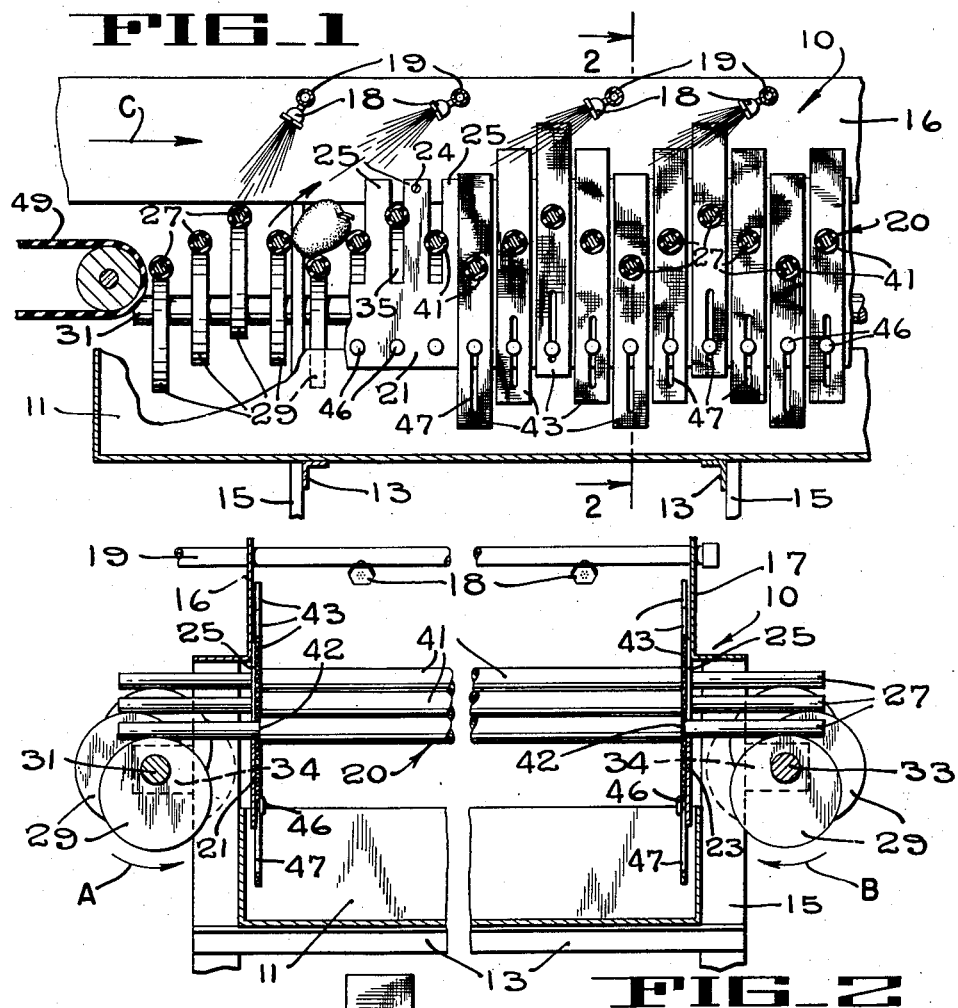
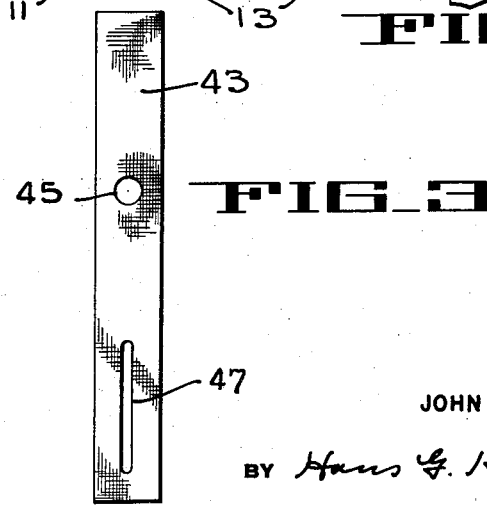
INVENTOR
JOHN A. BRADFORD
BY Hans G. Hoffmeister
ATTORNEY June 24, 1958     J. A. BRADFORD     2,840,090
CONVEYOR
Filed April 22, 1954     2 Sheets-Sheet 2
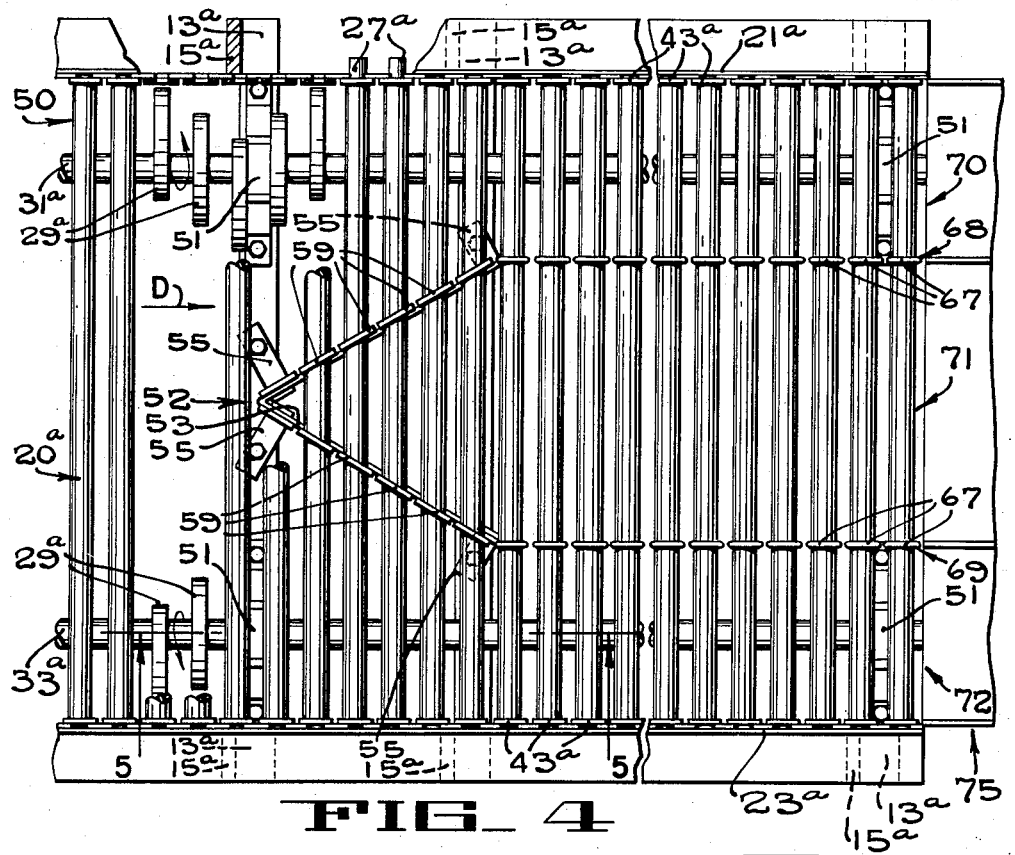
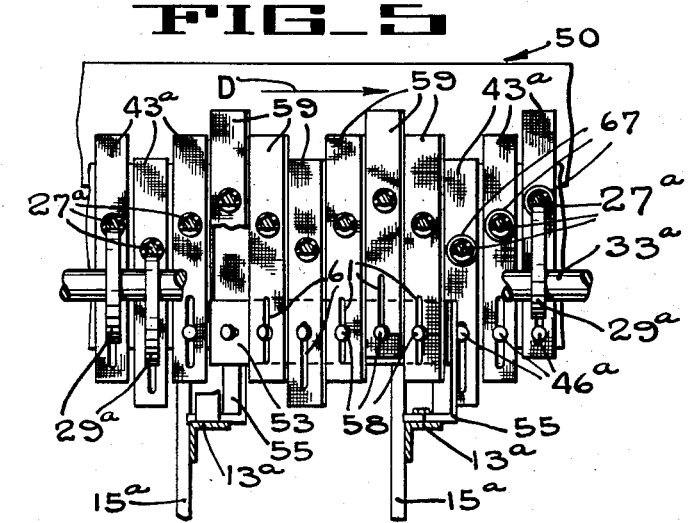
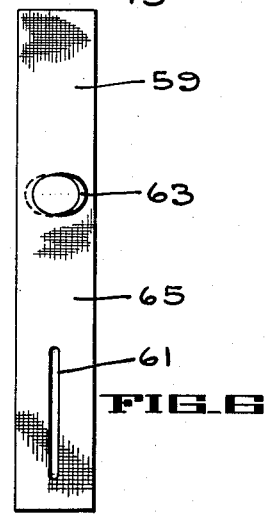
INVENTOR
JOHN A. BRADFORD
BY Hans G. Hoffmeister
ATTORNEY

United States Patent Office 2,840,090
Patented June 24, 1958

2,840,090

CONVEYOR

John A. Bradford, Wenatchee, Wash., assignor to Food Machinery and Chemical Corporation, San Jose, Calif., a corporation of Delaware Application April 22, 1954, Serial No. 424,863

18 Claims. (Cl. 134—151)

The present invention relates to conveyors and more particularly to improvements of that type of conveyor known in the trade as a wave motion conveyor.

Generally speaking, wave motion conveyors comprise a series of closely spaced parallel rods, or the like, disposed across the path of movement of the articles being conveyed and supported for substantially vertical reciprocation in such a manner that when the conveyor is in operation the rods form an undulating article supporting surface adapted to rotate and advance articles, for example, apples, along a predetermined path.

One object of the present invention is to provide an improved wave motion conveyor.

Another object is to prevent injury to the articles carried by a wave motion conveyor.

Another object of the present invention is to provide a wave motion conveyor having article deflecting means supported on its rods for guiding articles conveyed thereby and for protecting said articles from abrasion and bruising.

Another object is to provide a wave motion conveyor with means for dividing the mass of articles advanced by the conveyor.

These and other objects and advantages of the present invention will become apparent from the following description and the accompanying drawings in which:

Fig. 1 is a fragmentary longitudinal section of the feed end of a fruit washer provided with a sinusoidal type wave motion conveyor embodying the present invention.

Fig. 2 is a transverse section taken along the line 2—2 of Fig. 1.

Fig. 3 is an elevation of a part of the washer shown in Fig. 1.

Fig. 4 is a fragmentary plan view of the discharge end of a fruit sorter provided with a sinusoidal type wave motion conveyor embodying the present invention.

Fig. 5 is a vertical cross section taken along the line 5—5 of Fig. 4.

Fig. 6 is an elevation of a part of the fruit sorter shown in Fig. 4.

The present invention is shown embodied in a fruit washer 10 (Figs. 1 and 2) which comprises an elongated open top tank 11 supported above the floor by a plurality of transverse horizontal angle irons 13 secured to a number of upright iron bars 15 arranged along both sides of the tank 11. Longitudinally extending L-shaped plates 16 and 17 are arranged on opposite sides of the washer 10 above the lateral walls of the tank 11, said plates being secured to the upper ends of the bars 15. The L-shaped plates 16 and 17 are so positioned on the bars 15 (Fig. 2) that their long legs are upright and are arranged over the tank 11, and their short legs extend laterally outward. A plurality of liquid spray nozzles 18, carried by liquid supply pipes 19, are arranged between the plates 16 and 17 along the entire length of the washer, said nozzles being adapted to deluge water down upon a wave motion conveyor 20 (Figs. 1 and 2) disposed above the tank 11.

The conveyor 20 comprises comb-like plates 21 and 23 fastened by screws 24 (only one of which is shown) to the L-shaped plates 16 and 17, respectively, and depending therefrom into the tank 11. The plates 21 and 23 are formed with spaced teeth 25 which act as guides for a plurality of horizontally disposed, transversely extending rods 27 (Fig. 2) which span the tank 11 and rest freely on identical cams 29 secured on a pair of longitudinal shafts 31 and 33 rotatably mounted in brackets 34 on opposite sides of the washer laterally of the tank 11. The cams 29 are securely mounted on the shafts 31 and 33 so that corresponding portions of sucessive cams on each shaft are arranged around the shaft at ninety degree intervals with each other, and corresponding portions of laterally opposite cams are arranged at the same interval. This arrangement of the cams 29 positions the rods 27 in the form of a substantially sinusoidal wave, as may be clearly seen in Fig. 1. The shafts 31 and 33 are operatively connected with a source of power (not shown) which is adapted to cause the rotation thereof in the direction of the arrows A and B (Fig. 2), respectively. Such rotation of the shafts 31 and 33 will cause the cams 29 to vertically reciprocate the rods 27 in spaces 35 between the teeth 25, thus causing the substantially sinusoidal wave formed by the rods to move in the direction of the arrow C (Fig. 1), in a manner well known in the art.

The portion of each rod 27 between the comb-like plates 21 and 23 is provided with a thick coating or sleeve 41 (Fig. 1) of rubber, or the like material, for the purpose of preventing the abrasion and bruising of the fruit conveyed thereby. Two deflectors in the form of strips 43 (Fig. 3) of relatively soft, stiff material, such as rubber or belting, or of a rough or hard, stiff material faced with a relatively soft material, are mounted in spaced relation on each rod 27 between the end abutment surfaces 42 of the rubber sleeve 41 and the plates 21 and 23 by passing the rod 27 through a circular hole 45 formed in the strips. A longitudinal row of large-headed studs 46 (Fig. 1) is secured near the lower margin of each of the plates 21 and 23, one of said studs 46 being arranged directly beneath each rod 27. The lower end of each strip 43 is provided with a longitudinal slit 47 that is adapted to slidably receive the stud 46 arranged directly below the rod 27 on which each strip is mounted. This manner of mounting the strips 43 maintains them in an upright position on the rods 27 close to the plates 21 and 23, and adapts them for vertical reciprocation with said rods. To prevent bruising, abrading and cutting of the fruit by the sharp edges of the teeth 25 of the comb-like plates 21 and 23 as the fruit is advanced by the conveyor 20, and to prevent the flow of water out through the spaces 35 between the teeth 25, the strips 43 are considerably wider than the spaces 35 and are of such a length that when the rod 27 on which they are mounted is in its lowermost position the upper end of the strip is positioned above the upper end of the teeth 25. Thus the sharp edges of the teeth 25 and the spaces 35 therebetween are completely covered by the strips 43 at all times, as shown in Fig. 1.

In operation, with the shafts 31 and 33 rotating in the direction of the arrows A and B (Fig. 2) and water flooding down over the rods 27 from the nozzles 18, fruit to be washed, e. g., apples, is fed to the wave motion conveyor 20 from a belt conveyor 49 (Fig. 1) located at the feed end of the wave motion conveyor 20. As the fruit is advanced in the direction of the arrow C (Fig. 1) by the wave motion of the conveyor rods 27 they are also given a clockwise rotation, as indicated in Fig. 1. As a consequence the entire surface of the fruit is subjected to the washing action of the water flooding down on them from above. All dirt, residual spray material, or the like, will thus be removed from the fruit and will be entrained in the wash water which falls between the rods 27 into the drainage tank 11 positioned therebelow.

During the operation of the washer 10, the fruit advancing on the conveyor 20 may rub against the deflector strips 43. The strips 43, being made of or faced with a relatively soft material, do not abrade the fruit as the fruit rubs against them and the strips prevent the fruit from contacting the sharp corners of the metal teeth 25 which would seriously cut and bruise the fruit if the fruit were allowed to contact them. Furthermore regardless of the type of construction of the strips 43, they should be sufficiently stiff to stand upright at all times and to closely overlie the spaces 35 between the teeth 25. As a consequence thereof the strips 43 prevent the wash water from passing through the spaces 35 and out onto the floor surrounding the washer. Thus, the conveyor 20 is provided with water-tight sides which direct all of the wash water into the tank 11.

The modified form of the invention disclosed in Figs. 4, 5 and 6 is shown embodied in a fruit sorter 50 whose general construction is similar to that of the fruit washer 10 just described and disclosed in Figs. 1, 2 and 3. Consequently, a detailed description of only that part of the sorter 50 which differs from the washer 10 will be given, since that will suffice to give a complete understanding of the sorter's structure and operation. In the following description the parts of the sorter 50 which correspond to parts in the washer 10 will be indicated by the same numeral with the suffix "a" added. The fruit sorter 50 shown in Figs. 4, 5 and 6 is generally the same as the fruit washer 10 shown in Figs. 1, 2 and 3 except that: the sorter does not have the liquid spray nozzles 18 nor the water receiving tank 11; the sorter has its cam shafts 31a and 33a positioned inwardly of the plates 21a and 23a on bearings 51; and the sorter is provided adjacent its discharge end with a divider 52 (Figs. 4 and 5). As in the washer 10 the conveyor 20a of the sorter 50 is adapted to advance and rotate the fruit supplied thereto, the direction of fruit advance being indicated by the arrow D (Figs. 4 and 5).

The divider 52 (Fig. 4) comprises a narrow strap of metal 53 bent to form a V whose width is about one half that of the conveyor 20a, as shown in Fig. 4. The strap 53 is positioned just below the wave motion conveyor 20a with its apex on the longitudinal center line of the sorter and pointing toward the feed end thereof. The strap 53 is supported by four angle brackets 55 bolted to two of the transverse angle irons 13a connected to the upright bars 15a. A horizontally spaced series of large-headed studs 58 (Fig. 5) are secured to the outer surface of the V-shaped strap 53, each stud being directly beneath a rod 27a. Each of the studs 58 is adapted to slidably button a deflector strip 59 (Fig. 6) of soft, stiff material, such as rubber or belting, or of a rough or hard, stiff material faced with a relatively soft material, to the V-strap 53 through cooperation with a wide, longitudinal slit 61 provided in the lower portion of the strip 59. The strips 59 are provided above their slits 61 with an elliptical hole 63 so formed that the rods 27a may pass therethrough at an acute angle with the broad face 65 of the strips, as shown in Figs. 4 and 5. When thus mounted on the V-strap 53 and on the rods 27a, the strips 59 are free to move up and down with the rods 27a and their free ends project upwardly above the rods 27a presenting a wedge-shaped array of strips 59 to fruit advancing on the sorter. Each of the rods 27a between the rear end of the divider 51 and the discharge end of the conveyor 20a is provided with a pair of close fitting rings 67 made of a soft material, such as rubber. The rings 67 are arranged in two longitudinal lines 68 and 69 (Fig. 4) one of which extends rearwardly from each trailing end of the divider 52. The two lines 68 and 69 of rings 67, in conjunction with the strips 43a at the rear of the divider 52, form three parallel fruit lanes 70, 71 and 72.

In operation, with the wave motion conveyor 20a in action, fruit, such as apples, to be sorted is supplied to the feed end of the sorter (not shown) for advancement thereover in the direction of the arrow D (Fig. 4). When the fruit reaches the divider 52 it is separated thereby, half of the apples being directed into the lane 70 and the other half being directed into the lane 72. The upstanding strips 59 of the divider 52 regardless of their construction should have sufficient stiffness that they will not bend back and allow the fruit to pass into the lane 71, and since they are made of or faced with a soft material they will not bruise or abrade the fruit as it strikes them. Sorting personnel stand beside the sorter 50 adjacent the lanes 70 and 72 and as the apples are advanced past them they pick out those of inferior quality and place them in the middle lane 71 leaving only apples of the highest quality in the lanes 70 and 72. The two lines of rings 67 keep the apples in the lanes 70, 71 and 72 separated as they move toward the discharge end 75 of the sorter 50 where they leave the sorter for further processing.

While I have described certain preferred embodiments of the present invention it will be understood that various changes and modifications may be made in the details thereof without departing from the spirit and scope of the appended claims.

Having thus described the invention what I claim as new and desire to protect by Letters Patent is:

1. An article conveyor comprising a plurality of article supporting rods, means moving said rods for imparting a wave-like motion to the article contacting surfaces of the rods to advance the articles thereon, and article contacting means supported by the rods for movement therewith to direct the movement of articles advanced by the rods.

2. In a wave motion article conveyor of the type having a plurality of parallel rods mounted for substantially vertical reciprocation in a wave-like relationship for the advancement of articles resting thereon, the combination therewith of an article deflector mounted on one of the rods intermediate its ends for movement therewith and extending thereabove for contact with articles advanced by the rods.

3. In a wave motion article conveyor of the type having a plurality of parallel rods mounted for substantially vertical reciprocation in a wave-like relationship for the advancement of articles resting thereon in a direction at right angles to the rods, the combination of an article deflector loosely mounted on one of the rods, and means adapted to maintain the deflector in a predetermined position on the rod.

4. An article conveyor comprising a plurality of parallel rods for supporting articles, means imparting a vertical reciprocating movement to said rods in a wave-like motion for advancing the articles thereon, and a relatively stiff strip of material supported on one of the rods for movement therewith and extending thereabove for contact with articles being advanced by the rods to direct the movement of articles on the rods, said strip presenting a relatively soft surface to articles advancing over the rods.

5. An article conveyor comprising a plurality of article supporting rods, means imparting a vertical reciprocating movement to said rods in a wave-like relationship for advancing articles supported on the rods along a predetermined path, and article deflectors separate from the motion imparting means mounted in spaced relation on the rods for movement therewith to confine the articles advanced by the conveyor to said predetermined path.

6. An article conveyor comprising a plurality of parallel rods for supporting articles, means imparting a vertical reciprocating movement to said rods in a wave-like motion for advancing articles in a direction at right angles to the rods, strips of relatively soft, stiff material encircling the rods mounted in spaced relation thereon and extending thereabove to direct the movement of articles advanced by the conveyor, and means adapted to maintain the strips in predetermined positions on the rods.

7. An article conveyor for a washer including means for deluging articles on the conveyor with liquid, said conveyor comprising a frame having spaced side walls, a plurality of transversely extending parallel rods projecting through apertures in the side walls, means supporting the rods for vertical reciprocation in a wave-like relation for advancing articles resting on the rods, and strips of a relatively stiff material mounted on the rods and adapted to overlie the apertures in the side walls to deflect articles from the side walls and to prevent the passage of liquid through the apertures in the side walls, said strips presenting a relatively soft surface to the articles advancing over the rods.

8. A wave motion article conveyor comprising a plurality of parallel rods mounted for substantially vertical reciprocation in a wave-like relationship for advancing articles resting thereon in a direction at right angles to the rods, and a V-shaped article divider mounted on the rods to divide articles advanced by the rods into separate groups.

9. A wave motion article conveyor comprising a plurality of parallel rods mounted for substantially vertical reciprocation in a wave-like relationship for advancing a mass of articles resting thereon in a direction at right angles to the rods, and a V-shaped series of article deflectors mounted on the rods intermediate the ends of the rods to divide the mass of articles advanced by the conveyor.

10. A wave motion article conveyor comprising a plurality of parallel rods mounted for substantially vertical reciprocation in a wave-like relationship for advancing a mass of articles resting thereon in a direction at right angles to the rods, a V-shaped series of article deflectors mounted on the rods intermediate their ends to divide the mass of articles advanced by the conveyor, and a V-shaped series of stationary guides adapted to slidably engage the article deflectors to maintain them in a V-shaped arrangement on the rods.

11. In a wave motion article conveyor of the type having a plurality of parallel rods mounted for substantially vertical reciprocation in a wave-like relationship for the advancement of articles resting thereon in a direction at right angles to the rods, the combination therewith of a plurality of strips of soft, stiff material mounted in a wedge-shaped array on the rods for movement therewith, said strips extending above the rods to divide the articles advanced by the rods into separate lanes.

12. A wave motion article conveyor comprising a plurality of parallel rods mounted for substantially vertical reciprocation in a wave-like relationship for advancing articles at right angles to the rods, spaced-apart article deflectors mounted on each rod to confine the movement of articles advanced by the conveyor, and a wedge-shaped array of article deflectors mounted on the rods between the spaced-apart article deflectors to divide the articles advanced by the rods into separate lanes.

13. An article conveyor comprising a frame including transversely spaced, longitudinally extending angle bars, a longitudinally extending guide plate secured to each angle bar so as to depend therefrom, each plate being provided beneath the angle bars with a plurality of spaced guide openings, a longitudinal series of transversely extending article supporting rods arranged in opposite ones of said guide openings, and means for imparting a vertical reciprocating article advancing motion to the rods.

14. Apparatus according to claim 13 wherein article deflectors are supported by the rods for movement therewith, said deflectors having a slot therein, and means mounted on the guide plate and extending through said slot to maintain the deflector in a predetermined position on the rods.

15. An article conveyor comprising a frame having spaced side walls, a plurality of transversely extending parallel rods projecting through apertures in the side walls and having an abutment surface adjacent each side wall, means supporting the rods for vertical reciprocation in a wave-like relationship for advancing articles resting on the rods, and article deflectors of soft stiff material supported on the rods for movement therewith and pressed against the side walls by the abtument surfaces on said rods to completely cover said side wall apertures.

16. An article conveyor comprising a frame having spaced side walls, a plurality of transversely extending parallel rods projecting through apertures in the side walls, means supporting the rods for vertical reciprocation in a wave-like relationship for advancing articles resting on the rods, article deflectors having a hole and a slot therein arranged opposite the apertures in the side walls, said rods extending through the deflector holes to support the deflectors and to impart vertical reciprocation thereto, and studs mounted on the side walls and adapted to mate with the slots in the article deflectors to slidably lock the deflectors to the side walls.

17. In an article washer including a frame having spaced side walls, a plurality of transversely extending parallel rods projecting through apertures in the side walls, means supporting the rods for vertical reciprocation in a wave-like relationship for advancing articles resting on the rods, means for deluging articles on the rods with liquid, and a tank beneath the rods for receiving the liquid deluged on the articles; the combination therewith of vertical article deflectors supported on the rods for movement therewith, one end of said deflectors extending into the tank at all times and the other end extending above the upper edge of the apertures in the side walls at all times to direct the deluging liquid into the tank.

18. An article conveyor comprising a frame having spaced side walls, a plurality of transversely extending parallel rods projecting through slots in the side walls, means supporting the rods for vertical reciprocation in a wave-like relationship for advancing articles resting thereon along a predetermined path, and article deflectors of soft stiff material mounted on the rods between the side walls and the path of the advancing articles to prevent the articles from contacting the slotted side walls of the conveyor, thereby preventing their abrasion and bruising by the side walls.

References Cited in the file of this patent

UNITED STATES PATENTS

| | | |
|---|---|---|
| 1,760,369 | Moe | May 27, 1930 |
| 1,795,450 | Sells | Mar. 10, 1931 |
| 1,951,046 | Wuest | Mar. 13, 1934 |
| 1,958,322 | Symington | May 8, 1934 |
| 2,166,644 | Severin | July 18, 1939 |
| 2,241,978 | Buck | May 13, 1941 |
| 2,566,417 | Holm | Sept. 4, 1951 |
| 2,662,631 | Kraus | Dec. 15, 1953 |